US007956477B2

(12) United States Patent
Yu et al.

(10) Patent No.: US 7,956,477 B2
(45) Date of Patent: Jun. 7, 2011

(54) STARTER RELAY CONTROL

(75) Inventors: Songping Yu, Troy, MI (US); Giuseppe Domenico Suffredini, Shelby Township, MI (US); Robert Teran, Jr., Livonia, MI (US); Craig Cabadas, Dearborn, MI (US); Kiana Danielle Whitehead, Romulus, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 904 days.

(21) Appl. No.: 11/872,167

(22) Filed: Oct. 15, 2007

(65) Prior Publication Data

US 2009/0096400 A1 Apr. 16, 2009

(51) Int. Cl.
*H02P 9/00* (2006.01)

(52) U.S. Cl. ................ 290/28; 290/27; 290/29; 290/35; 290/55; 180/65.2; 477/3

(58) Field of Classification Search .................... 290/27, 290/28, 29, 35, 55, 48; 318/43; 180/65.2; 477/2, 3; 475/5
See application file for complete search history.

(56) References Cited

U.S. PATENT DOCUMENTS

| | | | | |
|---|---|---|---|---|
| 5,936,316 | A | 8/1999 | Jukiewicz et al. | |
| 6,104,157 | A | 8/2000 | Kramer et al. | |
| 6,181,404 | B1 | 1/2001 | Gaffney | |
| 6,481,404 | B1 | 11/2002 | Perry et al. | |
| 6,969,923 | B2 * | 11/2005 | Kitagawa .................... | 290/36 R |
| 7,180,201 | B2 * | 2/2007 | Kusumi et al. .............. | 290/40 C |
| 2002/0014216 | A1 | 2/2002 | Boegner et al. | |
| 2002/0014219 | A1 | 2/2002 | Suzuki et al. | |
| 2005/0236900 | A1 | 10/2005 | Kahara et al. | |

* cited by examiner

*Primary Examiner* — T C Patel
*Assistant Examiner* — Iraj A Mohandesi
(74) *Attorney, Agent, or Firm* — Allan J. Lippa; Alleman Hall McCoy Russell & Tuttle LLP

(57) ABSTRACT

A starter control system is disclosed. In one example, the starter control system allows both automatic and manual control over an engine starting sequence. The starter control system can enhance starter control system flexibility.

20 Claims, 2 Drawing Sheets

STARTER RELAY CONTROL

BACKGROUND/SUMMARY

Electric starter motors can be used to initiate piston motion in an internal combustion engine before combustion alone can reliably reciprocate the pistons. Some starter motors are controlled by a starter motor relay having a low side that is controlled by a powertrain control module, and a high side powered directly through the ignition key circuit. Once the engine starts, the powertrain control module disables the low side of the starter relay, which turns the starter motor off.

The inventors herein have recognized several issues with this approach. In particular, the crank duration is limited by how long the operator keeps the ignition key at a START position. If the key is released prematurely, the result may be excessive fuel in the cylinders, extended engine cranks, and/or potentially rough engine starts.

Another type of an electric starter motor is described in U.S. Pat. No. 6,481,404. In this example, a starter relay is also used to turn the starter motor on and off. However, the starter relay is connected to controllers that make all decisions as to when the starter motor is to be turned on and off.

The inventors herein have recognized several issues with this approach. In particular, once an operator initiates an engine startup, all control is taken away from the operator. This can produce unsatisfying operator feedback, and does not allow an operator to override decisions made by the controllers.

In one embodiment, the above issues may be addressed by a starter control system that includes a starter relay that is independently controllable by a control module and an ignition switch. The starter relay includes a high side node and a low side node and is controllable to selectively enable power delivery from a power source to a starter motor responsive to activation of the high side node and the low side node. The starter control system also includes a control module including a high side driver in operative communication with the high side node of the starter relay and a low side driver in operative communication with the low side node of the starter relay. Furthermore, the starter control system includes an ignition switch in operative communication with the high side node of the starter relay and in operative communication with the control module. Such an arrangement allows the high side node to be automatically turned on via the control module, or manually turned on directly via the ignition switch.

DETAILED DESCRIPTION

The present disclosure is directed to a starter control system in which an ignition switch commands a control module to automatically activate a starter relay according to a predefined logic, but where activation of the starter relay can be extended past a time allotted by the predefined logic if the ignition switch continues to issue a start command. In this way, the benefits of automatic starter control can be realized without taking all control away from an engine operator.

Figure 1:
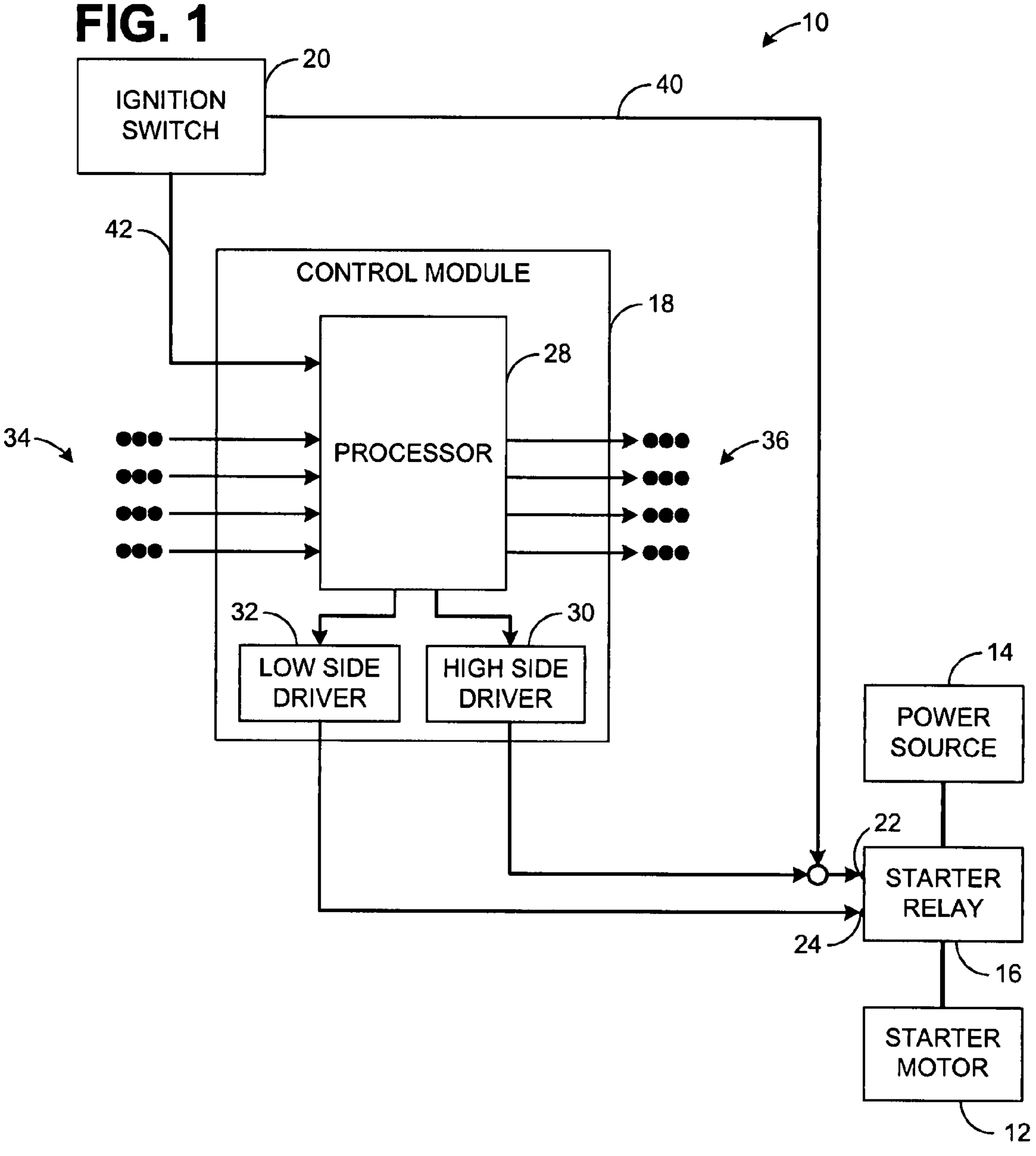
FIG. 1 shows a nonlimiting example of a starter control system in accordance with the present disclosure.

FIG. 1 shows a nonlimiting example of a starter control system 10 in accordance with the present disclosure. Starter control system 10 includes a starter motor 12, a power source 14, a starter relay 16, a control module 18, and an ignition switch 20.

Starter motor 12 initiates piston motion in an internal combustion engine before combustion alone can reliably move the pistons. The starter motor can be configured to compliment a variety of different types and/or sizes of internal combustion engines. Furthermore, the herein disclosed control system and control logic can be used with devices other than those designed to facilitate the starting process of an internal combustion engine. The control system and control logic can be used to selectively start and stop virtually any switchable device without departing from the intended scope of this disclosure.

A power source 14 is in operative communication with the starter motor, such that the power source can deliver power to the starter motor, thus activating the starter motor. Power source 14 can include a battery, although this is not required in all embodiments. Other power sources including, but not limited to, capacitive chargers and fuel cell systems can be used to selectively power the starter motor.

Starter relay 16 is operatively interposed between the power source and the starter motor. The starter relay can be controlled to selectively enable power delivery from power source 14 to starter motor 12. The starter relay includes a high side node 22 and a low side node 24. When both high side node 22 and low side node 24 are activated, the starter relay allows power to be delivered from the power source to the starter motor. When either the high side node or the low side node is deactivated, the starter relay stops power delivery from power source 14 to starter motor 12. The starter relay can be any suitable switching device, including, but not limited to, electromechanically-actuated switches and transistor-based switches. The functionality of the high side node can be exchanged with the functionality of the low side node without departing from the scope of this disclosure.

Control module 18 is configured to selectively activate one or more of the high and low side drivers based on a predefined logic, described in more detail below with reference to FIG. 2. The control module can include hardware, software, firmware, and/or a combination thereof. For example, in the illustrated embodiment, the control module includes a processor 28, which receives a starter input from ignition switch 20. Processor 20 is configured to translate input from the ignition switch into starter inputs issued to the starter relay from one or more of the high side and low side drivers based on a predefined logic, as described below.

Control module 18 includes a high side driver 30 and a low side driver 32. The high side driver is in operative communication with the high side node of the starter relay. The high side driver is configured to deliver a starter input to the high side node in order to activate the high side node. Similarly, the low side driver is in operative communication with the low side node of the starter relay and is configured to deliver a starter input to the low side node in order to activate the low side node.

The control module is in operative communication with ignition switch 20, and is capable of receiving one or more different starter inputs from the ignition switch. Ignition switch 20 provides a starter input to control module 18 and directly to high side node 22 of starter relay 16.

As indicated generally at 34, control module 18 and/or processor 28 may optionally include one or more additional inputs, which can be used to make control decisions. Nonlimiting examples of such inputs include ISP-R/RUN-START information, passive antitheft information, transmission information, crank position information, power source information, and the like. As indicated generally at 36, control module 18 and/or processor 28 may optionally include one or more additional outputs. Nonlimiting examples of such outputs include starter request information to other vehicle systems, diagnostic information, and the like. Furthermore, the output from one or more of the high side and low side drivers can be supplied to devices and/or systems other than the starter relay without departing from the scope of this disclosure.

The ignition switch provides a starter input to the control module so that the control module can manage an automatic starting procedure. Such an automatic starting procedure can help ensure that the starter motor is not prematurely turned off, which can produce undesirable results. The ignition switch also provides a starter input to the high side node of the starter relay that is not subject to automatic control by the control module. This allows an operator to extend the duration that the high side node is activated, which can provide additional control to the operator and/or improve operator feedback. The ignition switch can include a key operated switch, a push button switch, or virtually any other switching device.

An operator can start the starter motor to facilitate engine cranking by turning the ignition key to the START position, which enables the high side of the starter relay via an ignition line 40 and provides a starter input to the control module via a starter-request line 42. Upon receiving a starter input, the control module validates safe-to-crank conditions, checks for a positive passive anti-theft confirmation, and enables the low side of the starter relay. In this manner, the low side driver activates the low side node of the starter relay and the ignition switch directly activates the high side node of the starter relay. With both the high side node and the low side node activated, the starter relay allows power to be delivered to the starter motor, and the starter motor begins cranking.

After the control module senses engine rotation, the control module can enable the high side driver to power the high side of the starter relay to ensure continued cranking until the engine starts, a cranking timer expires, or a safety violation occurs. Such automatic control of the high side node can help prevent the starter motor from being turned off too soon if the operator releases the ignition key prematurely. Automatically controlling the high side driver upon sensed engine rotation makes the system more robust to voltage fluctuation during engine cranking, and to starter-request line signal noise. It also gives the operator more consistent behavior.

The control module can keep both the low side and high side of the starter relay at the enabled state until the engine starts or a safety violation occurs. By taking complete command of the cranking duration, the control module can facilitate consistent and robust engine starts.

A cranking status can be communicated from the control module to other modules via one or more control area networks for accessory load management and other functions.

The control module can disengage the starter motor once an engine is successfully started, regardless of the duration that a starter input is delivered to the control module via the starter-request line, and regardless if a predefined cranking timer expires. The operator can simply initiate engine cranking by rotating the key to the limit of its travel, or otherwise turning an ignition switch to its START position. The control module then can automatically control the process of starting the engine. The control module can be configured to avoid starter reengagement when an engine is running. The control module can also be configured to disengage the starter after a predetermined engine speed has been reached to protect excessive overrun. The automatic crank to start feature can be selectively disabled by the control module, for example when a low battery voltage condition exists. In such cases, the system is capable of returning all control of the high side node of the starter relay to the operator, and will continue to crank until the engine starts as long as the ignition switch is kept at a START position.

Operatively coupling the high side node of the starter relay to both the high side driver and the ignition switch allows the high side of the starter relay to be activated by enabling the high side driver of the control module or by turning the ignition key to a START position. The control module can be configured to attempt automatic control for a maximum allowed crank time, as determined by a cranking timer. Because the high side driver is directly controllable by the ignition switch, an operator is able to take control of the engine start by holding the ignition key in the START position. This allows the driver to extend cranking by keeping the ignition key at the START position. Providing such manual control provides an operator with a familiar user experience.

The above described starter control system enjoys several other advantages. The control module may also take advantage of a computer controlled shutdown mode in which the control module is able to detect a failure mode at the starter-request line, thus benefiting both diagnostics and service engineering. The control module can disable engine starts if any key safety input has malfunctioned, thus improving safety. The control of the low side of the starter relay is directly tied to driver intent, which is more robust to potential circuit noise. Activation of the high side of the starter relay by the control module can be disabled via an output state control function, which can provide service options to service engineering.

Figure 2:
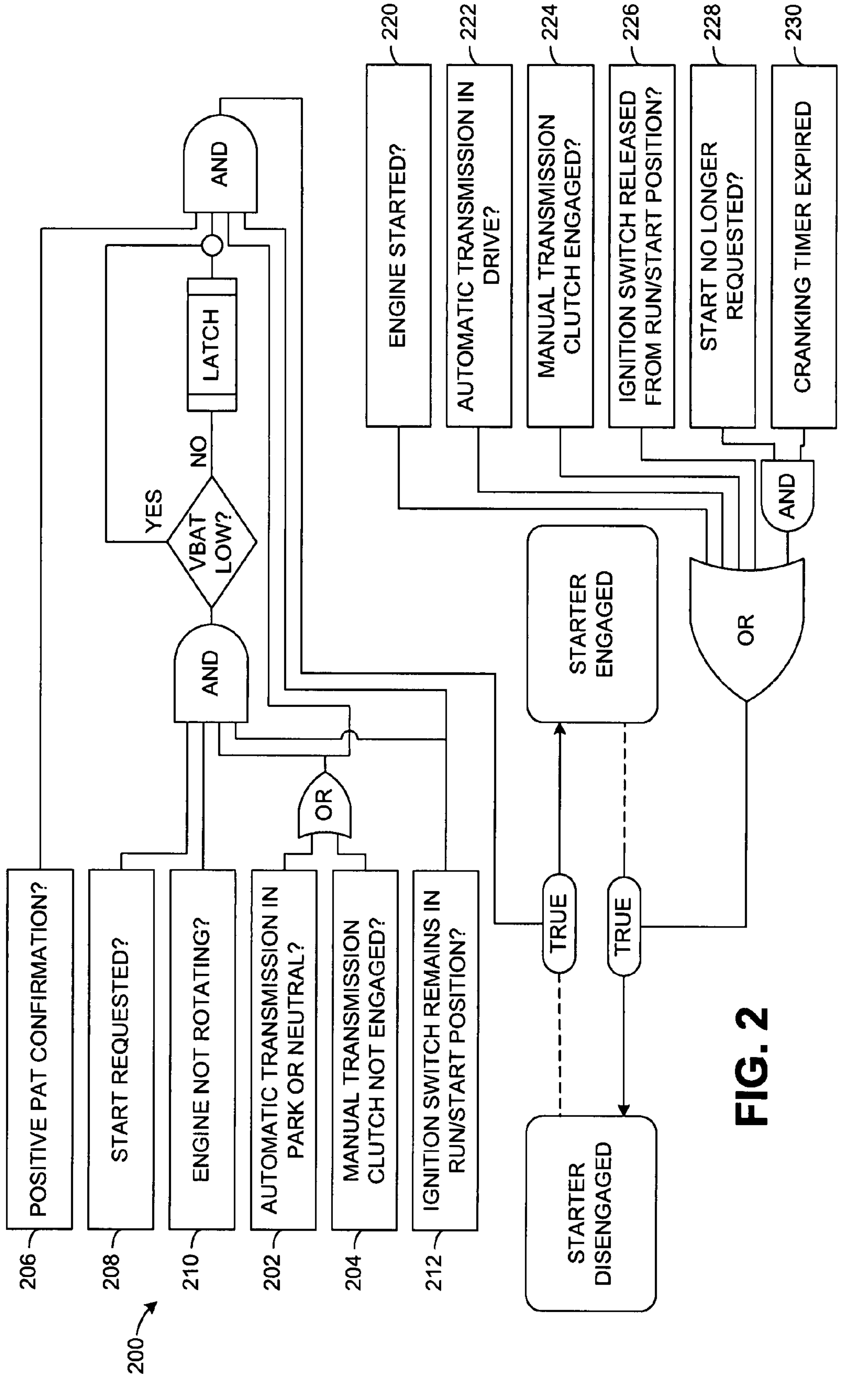
FIG. 2 shows a nonlimiting example of a process flow for controlling the starter control system of FIG. 1.

FIG. 2 shows a nonlimiting example of a process flow 200 that the control module can use to control the low side driver of the above described starter control system. The control logic illustrated by the process flow can be implemented by any combination of hardware and software. The illustrated process flow achieves a quick and consistent response, safe operation, and necessary hardware protection. It should be understood that modifications can be made to the illustrated process flow without departing from the scope of the present disclosure.

Process flow 200 begins by determining, at 202, if an automatic transmission is in park or neutral or, at 204, if the clutch of a manual transmission is not engaged. If either condition exists, it is also determined, at 206, that there is a positive passive anti-theft confirmation; at 208, that a start has been requested; at 210 that the engine is not rotating, and, at 212, that the ignition switch remains in a RUN/START position. If all such conditions exist, control module commands the low side driver to issue a start input to the low side node of the starter relay.

The process flow continues to monitor the system to determine if the start input from the low side driver to the low side node of the starter relay should be stopped. The starter input is stopped if any of the following conditions exist: at 220, the engine starts, at 222, an automatic transmission is put into drive; at 224, the clutch of a manual transmission is engaged; at 226, the ignition switch is released from the RUN/START position; and at 228 and 230, the cranking timer expires and a start is no longer requested.

The high side driver can be enabled after the low side driver is enabled and after engine rotation begins. The high side driver can be disabled immediately after the low side driver is disabled.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A starter control system, comprising:

a power source;

a starter motor in operative communication with the power source;

a starter relay operatively interposed between the power source and the starter motor, the starter relay including a high side node and a low side node and being controllable to selectively enable power delivery from the power source to the starter motor responsive to activation of the high side node and the low side node;

a control module including a high side driver in operative communication with the high side node of the starter relay and a low side driver in operative communication with the low side node of the starter relay; and an ignition switch in operative communication with the high side node of the starter relay and in operative communication with the control module.

2. The starter control system of claim 1, where the high side node activates responsive to a starter input from the ignition switch, the high side node activates responsive to a starter input from the high side driver, and the low side node activates responsive to a starter input from the low side driver.

3. The starter control system of claim 2, where the ignition switch sends a starter input to activate the high side node responsive to the ignition switch turning to a START position.

4. The starter control system of claim 3, where the ignition switch continually sends a starter input to activate the high side node until the ignition switch is released from the START position.

5. The starter control system of claim 2, where the high side driver sends a starter input to activate the high side node responsive to the control module detecting engine rotation.

6. The starter control system of claim 5, where the high side driver continually sends a starter input to activate the high side node until a cranking timer expires or the control module detects an engine start or a safety violation.

7. The starter control system of claim 6, where the low side driver sends an extended starter input after the cranking timer expires until the ignition switch is released from a START position.

8. The starter control system of claim 2, where the low side driver sends a starter input to activate the low side node responsive to the control module detecting a start command from the ignition switch and confirming safe operation conditions.

9. The starter control system of claim 8, where the low side driver continually sends a starter input to activate the low side node until a cranking timer expires or the control module detects an engine start or a safety violation.

10. The starter control system of claim 9, where the low side driver sends an extended starter input after the cranking timer expires until the ignition switch is released from a START position.

11. The starter control system of claim 1, where the control module includes a processor that activates the low side driver responsive to receiving a start request from the ignition switch.

12. The starter control system of claim 11, where the starter relay initially enables power delivery from the power source to the starter motor based on the low side driver activating the low side node of the starter relay and the ignition switch directly activating the high side node of the starter relay.

13. The starter control system of claim 1, where the high side node is activated according to a predetermined control logic to allow automatic starter control, and where the high side node is manually activated directly responsive to operator command to allow selective manual extension of the automatic starter control.

14. The starter control system of claim 13, further comprising a cranking timer for determining duration of automatic cranking control.

15. The starter control system of claim 14, where the control module includes a processor configured to translate input from the ignition switch into starter inputs issued to the starter relay from one or more of the high side and low side drivers based on a predefined logic.

16. The starter control system of claim 15, where the control module commands the low side driver to issue a start input to the low side node of the starter relay in response to a transmission engaged in neutral or park.

17. The starter control system of claim 15, where the control module commands the low side driver to issue a start input to the low side node of the starter relay in response to a clutch of a manual transmission that is not engaged.

18. The starter control system of claim 15, where the processor continues to activate the high side driver and the low side driver until a cranking timer expires or the control module detects an engine start or a safety violation.

19. The starter control system of claim 18, where the processor continues to activate the low side driver after the cranking timer expires when the ignition switch continues to activate the high side node of the starter relay.

20. The starter control system of claim 1, where the starter relay enables power delivery from the power source to the starter motor responsive to the ignition switch turning on, where the starter relay automatically continues to enable power delivery from the power source to the starter motor until an engine start, a safety violation, or a cranking timer expiration; and where the starter relay extends power delivery from the power source to the starter motor after cranking timer expiration until an engine start, a safety violation, or the ignition switch is released from a START position.

* * * * *